United States Patent [19]

Goldschmidt

[11] Patent Number: 5,146,867
[45] Date of Patent: Sep. 15, 1992

[54] PASSIVE RODENT CONTROL SYSTEM

[76] Inventor: S. A. Goldschmidt, 3525 Eel Rock Rd., Myers Flat, Calif. 95554

[21] Appl. No.: 777,038

[22] Filed: Oct. 16, 1991

[51] Int. Cl.$^5$ .............................. A01N 29/00
[52] U.S. Cl. ................................. 116/22 A
[58] Field of Search .......... 116/22 A; 367/139; 211/119.1

[56] References Cited

U.S. PATENT DOCUMENTS

| | | | |
|---|---|---|---|
| 358,819 | 3/1887 | Power | 211/119.1 |
| 2,283,987 | 5/1942 | Hammar | 211/119.1 |
| 3,517,635 | 6/1970 | Kuhl et al. | 116/22 A |
| 3,712,556 | 1/1973 | Bosco | 211/119.1 |
| 4,097,838 | 6/1978 | Fiala | 43/124 |
| 4,215,429 | 7/1980 | Riach | 116/22 A |
| 4,366,562 | 12/1982 | McGinty | 367/139 |
| 4,943,953 | 7/1990 | Kafi | 367/139 |

FOREIGN PATENT DOCUMENTS

| | | | |
|---|---|---|---|
| 2267037 | 11/1975 | France | 116/22 A |
| 2581506 | 11/1986 | France | 116/22 A |

*Primary Examiner*—Ian J. Lobo
*Attorney, Agent, or Firm*—Henderson & Sturm

[57] ABSTRACT

A passive rodent control system (10) for generating vibrations in the soil to discourage burrowing rodents wherein the system comprises a pair of ground penetrating metal stakes (20) having at least one tensioned ribbon (30) stretched between the upper ends of the metal stakes (20); wherein, the force of cross-winds against the tensioned ribbon will cause the metal stakes (20) to vibrate.

3 Claims, 1 Drawing Sheet

U.S. Patent    Sep. 15, 1992    5,146,867
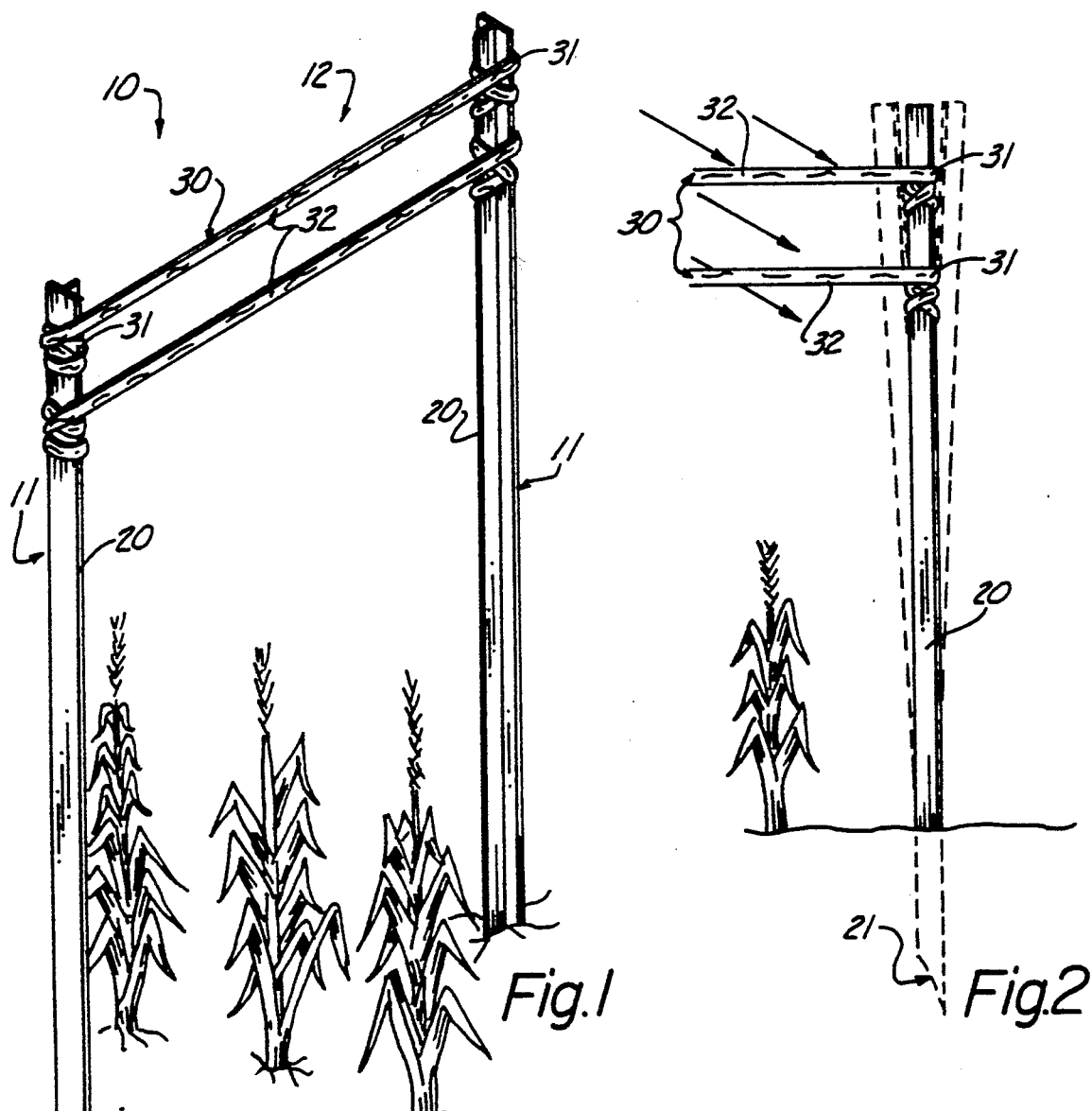
Fig.1
Fig.2
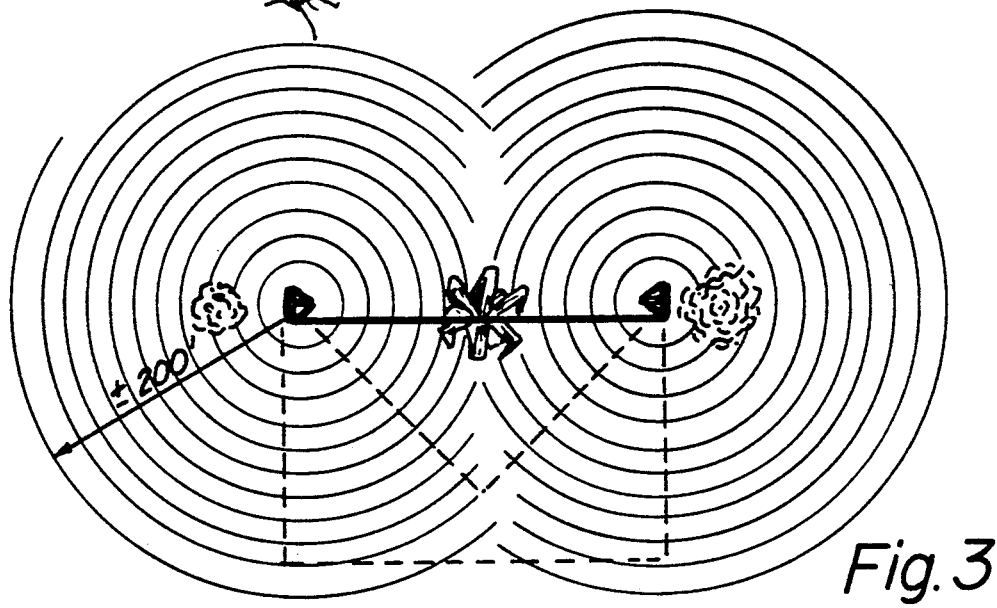
Fig.3

PASSIVE RODENT CONTROL SYSTEM

TECHNICAL FIELD

The present invention relates to vibrating rodent control systems in general, and in particular to a passive rodent control system.

BACKGROUND ART

As can be seen by-reference to the following U.S. Pat. Nos. 4,366,562; 4,215,429; 4,097,838; and 4,943,953; the prior art is replete with myriad and diverse electrical rodent control systems.

While all of the aforementioned prior art constructions are more than adequate for the basic purpose and function for which they have been specifically designed, these patented constructions not only are very structurally complex but also require an electrical power source to function properly.

Obviously when a rodent infestation involves large areas these patented structures are much to costly to be used effectively to discourage rodent damage over more than a small percentage of the surface area to be subjected to the repelling vibrations produced by the devices.

As a consequence of the foregoing situation, there has existed a longstanding need among farmers, gardeners, and those individuals concerned with energy conservation for a passive wind driven vibrating system that is inexpensive as well as quick and easy to install; and, the provision of such a construction is a stated objective of the present invention.

DISCLOSURE OF THE INVENTION

Briefly stated, the present invention comprises a plurality of ground penetrating units which are operatively connected together by at least one vibration inducing air foil unit; wherein, the passage of wind over the air foil unit causes the ground penetrating units to transmit vibrations into the surrounding soil to disturb burrowing rodents such as moles and the like.

In addition the invention further comprises relatively cheap commercially available products which when combined together in accordance with the teachings of the invention, produce a very simple and effective means of discouraging burrowing invention.

As will be explained in greater detail further on in the specification, the sheer simplicity of this invention coupled with the fact that it a passive, ecologically sound system should prove to virtually guarantee its commercial acceptance by large segments of the population.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the device installed in a field or garden;

FIG. 2 is an isolated detail view of one side of the device; and,

FIG. 3 is a top plan view of the vibration patterns generated by the device.

BEST MODE FOR CARRYING OUT THE INVENTION

As can be seen by reference to the drawings, and in particular to FIG. 1, the passive rodent control system that forms the basis of the present invention is designated generally by the reference numeral (10). The system (10) comprises in general a pair of ground penetrating units (11) and an air foil unit (12). These units will now be described in seriatim fashion.

As can best be seen by reference to FIGS. 1 and 2, the ground penetrating units (11) comprise a pair of elongated metal stakes (20) having a generally T-shaped cross-sectional configuration and provided with a tapered sharpened point (21) on their lower ends, for penetrating the ground in a well recognized fashion.

As can also be seen by reference to FIGS. 1 and 2, the air foil unit (12) comprises one or more elongated strands of plastic ribbon (30) having their opposite ends (31) wrapped or tied to the upper ends of the spaced metal stakes (20), in such a manner that the intermediate portion (32) of the plastic ribbon (30) is maintained in a state of tension.

The reason for placing the plastic ribbon (30) into tension, is so that the intermediate portion (32) of the ribbon will act as a passive airfoil which when subjected to a cross-wind as indicated by the directional arrows in FIG. 2, will cause the interconnected metal stakes to vibrate thereby imparting resulting vibrations into the soil surrounding the stakes as depicted in FIG. 3.

In the preferred embodiment of the invention depicted in the drawings, the metal stakes (20) comprise standard eight foot metal fenceposts spaced generally seven to eight feet apart; wherein, the lower ends of the fenceposts have been driven one and one half to two feet into the ground.

In addition at least two strands of ribbon (30) are connected on the opposite ends (31) to the upper end of the stakes (20); wherein, the upper ribbon is attached approximately four inches from the top of the stakes and the lower ribbon is disposed four to six inches below the upper ribbon; and, wherein each of the ribbons is stressed by approximately eight pounds of tension.

Furthermore as indicated by the dashed lines of FIG. 3, when the user wishes to avail themselves of crosswinds coming from any direction additional stakes (20) and ribbons (30) may be deployed in a variety of geometrical configurations, such that vibrations will be transmitted to all of the stakes regardless of the direction of the wind.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A passive rodent control system for imparting air induced vibrations into the soil; wherein, the system comprises a plurality of elongated ground penetrating metal stakes having a top and bottom, and disposed at a selected distance from one another; wherein, the bottom of the metal stakes penetrate the ground to a selected depth; and, at least one generally thin, flat elongated flexible ribbon having its opposite ends secured proximate to the tops of said plurality of stakes, such that the flat intermediate portion of said at least one elongated ribbon is disposed in a vertical orientation and placed into a selected degree of tension between said stakes, such that when non-parallel wind forces encounter the flat intermediate portions of said at lest one flexible ribbon, wind generated vibrations are imparted to the bottoms of said metal stakes.

2. The system as in claim 1; further comprising at least one other generally thin flat elongated ribbon operatively associated with said metal stakes in the same manner and in a vertically spaced location relative to said at least one generally thin flat elongated ribbon.

3. The system as in claim 1; wherein, said at least one ribbon is fabricated from plastic.

* * * * *